United States Patent
Wang et al.

(10) Patent No.: US 11,071,091 B2
(45) Date of Patent: Jul. 20, 2021

(54) CONTENTION LEVEL SIGNALING FOR RESOURCE POOLS

(71) Applicant: AT&T Intellectual Property I, L.P., Atlanta, GA (US)

(72) Inventors: Xiaoyi Wang, Austin, TX (US); Salam Akoum, Austin, TX (US); Aditya Chopra, Austin, TX (US); Andrew Thornburg, Austin, TX (US); Milap Majmundar, Austin, TX (US); Thomas Novlan, Cedar Park, TX (US); Ralf Bendlin, Cedar Park, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/244,987

(22) Filed: Jan. 10, 2019

(65) Prior Publication Data
US 2020/0229140 A1 Jul. 16, 2020

(51) Int. Cl.
*H04W 72/02* (2009.01)
*H04W 72/06* (2009.01)
(Continued)

(52) U.S. Cl.
CPC ............ *H04W 72/02* (2013.01); *H04W 4/40* (2018.02); *H04W 72/0473* (2013.01); *H04W 72/06* (2013.01); *H04W 72/087* (2013.01)

(58) Field of Classification Search
CPC ... H04W 4/40; H04W 72/02; H04W 72/0473; H04W 72/06; H04W 72/087
See application file for complete search history.

(56) References Cited

U.S. PATENT DOCUMENTS 6,907,044 B1 6/2005 Yonge et al.
7,349,371 B2 3/2008 Schein et al.
(Continued)

FOREIGN PATENT DOCUMENTS

BR 112017004784 A2 * 12/2017 .......... H04W 68/005
CN 107079275 A * 8/2017 ............ H04W 76/14
(Continued)

OTHER PUBLICATIONS

Huawei et al., UE autonomous resource selection, Feb. 15, 2016, 3GPP, 3GPP TSG RAN WG1 Meeting #84, Tdoc: R1-160307 (Year: 2016).*

(Continued)

*Primary Examiner* — Eric Nowlin
(74) *Attorney, Agent, or Firm* — Amin, Turocy & Watson, LLP

(57) ABSTRACT

The technologies described herein are generally directed toward communicating determined contention levels of resource pools to user equipments enabling the user equipments to select from available resource pools. According to an embodiment, a system can comprise a processor and a memory that can store executable instructions that, when executed by the processor, facilitate performance of operations. The operations can include assigning determined contention levels to respective ones of a group of resource pools. The operations can further include communicating, to a user equipment device, the determined contention levels, enabling the user equipment device to select a resource pool of the group of resource pools based on the determined contention levels.

20 Claims, 10 Drawing Sheets

(51) Int. Cl.
*H04W 4/40* (2018.01)
*H04W 72/04* (2009.01)
*H04W 72/08* (2009.01)

(56) References Cited

U.S. PATENT DOCUMENTS

| | | | |
|---|---|---|---|
| 7,920,885 B2* | 4/2011 | Singh | H04W 76/14 |
| | | | 455/517 |
| 8,027,327 B2 | 9/2011 | Gupta et al. | |
| 8,085,709 B2 | 12/2011 | Franceschini et al. | |
| 8,204,026 B2* | 6/2012 | Gandham | H04W 74/02 |
| | | | 370/337 |
| 8,311,000 B2* | 11/2012 | Chmiel | H04W 74/04 |
| | | | 370/329 |
| 8,359,038 B2 | 1/2013 | Hakola et al. | |
| 8,451,782 B2* | 5/2013 | Denteneer | H04W 74/04 |
| | | | 370/329 |
| 8,767,644 B2 | 7/2014 | Wager et al. | |
| 9,094,942 B2 | 7/2015 | Wiberg et al. | |
| 9,674,865 B2 | 6/2017 | Pelletier et al. | |
| 9,894,698 B2 | 2/2018 | Tsai et al. | |
| 9,992,652 B2* | 6/2018 | Baghel | H04W 76/14 |
| 9,992,796 B2 | 6/2018 | Chen et al. | |
| 10,021,711 B2 | 7/2018 | Krishnamoorthy et al. | |
| 10,039,119 B2* | 7/2018 | Sorrentino | H04W 74/0808 |
| 10,051,516 B2 | 8/2018 | Wentink | |
| 10,136,462 B2 | 11/2018 | Kim et al. | |
| 10,440,709 B1* | 10/2019 | Borst | H04W 72/0446 |
| 10,440,742 B2* | 10/2019 | Sun | H04W 74/02 |
| 10,542,568 B2* | 1/2020 | Ashraf | H04W 74/0875 |
| 2008/0170521 A1 | 7/2008 | Govindan et al. | |
| 2009/0005057 A1* | 1/2009 | Lee | H04W 72/0446 |
| | | | 455/450 |
| 2009/0298528 A1 | 12/2009 | Cave et al. | |
| 2009/0316670 A1* | 12/2009 | Grandham | H04W 74/02 |
| | | | 370/338 |
| 2010/0014472 A1* | 1/2010 | Denteneer | H04W 74/04 |
| | | | 370/329 |
| 2010/0017537 A1 | 1/2010 | Linnartz et al. | |
| 2010/0067497 A1* | 3/2010 | Chmiel | H04W 74/04 |
| | | | 370/336 |
| 2014/0094183 A1 | 4/2014 | Gao et al. | |
| 2014/0324974 A1* | 10/2014 | Park | H04W 72/02 |
| | | | 709/204 |
| 2016/0057718 A1* | 2/2016 | Sorrentino | H04W 76/14 |
| | | | 370/350 |
| 2016/0080920 A1* | 3/2016 | Baghel | H04W 4/90 |
| | | | 455/404.1 |
| 2016/0112996 A1* | 4/2016 | Ou | H04W 72/082 |
| | | | 370/329 |
| 2016/0345357 A1* | 11/2016 | Fan | H04W 74/006 |
| 2017/0006505 A1 | 1/2017 | Liu | |
| 2017/0230957 A1 | 8/2017 | Wakabayashi et al. | |
| 2018/0027452 A1* | 1/2018 | Tanaka | H04L 1/0003 |
| | | | 370/329 |
| 2018/0092125 A1* | 3/2018 | Sun | H04W 74/02 |
| 2018/0234989 A1* | 8/2018 | Sun | H04W 72/10 |
| 2018/0295653 A1* | 10/2018 | Ashraf | H04W 72/10 |
| 2018/0324653 A1* | 11/2018 | Nagaraja | H04W 36/0044 |
| 2018/0324852 A1* | 11/2018 | Van Phan | H04B 7/02 |
| 2018/0332617 A1 | 11/2018 | Zeng et al. | |
| 2018/0332624 A1* | 11/2018 | Patel | H04W 74/0833 |
| 2018/0332627 A1 | 11/2018 | Chitrakar et al. | |
| 2018/0368178 A1 | 12/2018 | Dong | |
| 2019/0021095 A1* | 1/2019 | Xi | H04W 72/10 |
| 2019/0068281 A1* | 2/2019 | Jiang | H04W 74/085 |
| 2019/0069282 A1* | 2/2019 | Luo | H04W 72/04 |
| 2019/0159073 A1* | 5/2019 | Tang | H04W 72/082 |
| 2019/0246385 A1* | 8/2019 | Lin | H04L 43/0876 |
| 2019/0306835 A1* | 10/2019 | Hoang | H04W 72/082 |
| 2019/0313447 A1* | 10/2019 | Islam | H04W 74/04 |
| 2020/0059896 A1* | 2/2020 | Xu | H04W 72/044 |
| 2020/0178213 A1* | 6/2020 | Xu | H04W 24/02 |
| 2020/0187162 A1* | 6/2020 | Luo | H04W 72/085 |

FOREIGN PATENT DOCUMENTS

| | | | | |
|---|---|---|---|---|
| EP | 3010301 A1 * | 4/2016 | | H04L 5/0048 |
| EP | 3167684 A1 * | 5/2017 | | H04W 76/14 |
| EP | 3167684 B1 * | 1/2018 | | H04L 67/1044 |
| EP | 3010301 B1 * | 7/2018 | | H04L 5/006 |
| JP | 6400841 B2 * | 10/2018 | | H04L 67/1044 |
| KR | 20170054402 A * | 5/2017 | | H04W 4/90 |
| KR | 101889670 B1 * | 8/2018 | | H04W 68/005 |
| WO | 2011083452 | 7/2011 | | |
| WO | WO-2016039870 A1 * | 3/2016 | | H04L 67/1044 |
| WO | 2018140355 | 8/2018 | | |
| WO | WO-2020024208 A1 * | 2/2020 | | H04W 74/02 |

OTHER PUBLICATIONS

Xu, Dongyan, et al. "QoS and contentionaware multi-resource reservation." Cluster Computing 4.2 (2001): 95-107. 14 pages. https://www.researchgate.net/profile/Duangdao_Wichadakul/publication/3864004_QoS_and_contention-aware_multi-resource_reservation/links/00b49529e98971e479000000.pdf.

Cardoso, Kleber, V., et al. "Increasing throughput in dense 802.11 networks by automatic rate adaptation improvement." Wireless Networks 18.1 (2012): 95-112. 18 pages. https://pdfs.semanticscholar.org/2bec/62225eed95b9161056f5ee63e69de651e2cf.pdf.

Gupta, Piyush, et al. "Randomaccess scheduling with service differentiation in wireless networks." IEEE INFOCOM. vol. 3. Institute of Electrical Engineers Inc (IEEE), 2005. 12 pages. http://stolyar.ise.illinois.edu/rcmac-infocom05.pdf.

Bao, Lichun, et al. "A New Approach to Channel Access Scheduling for Ad Hoc Networks." Proceedings of the 7th annual international conference on Mobile computing and networking, ACM, 2001. 11 pages. http://www.cs.colorado.edu/~rhan/CSCI_7143_001_Fall_2002/Papers/Bao2001_channelaccessscheduling.pdf.

* cited by examiner

CONTENTION LEVEL SIGNALING FOR RESOURCE POOLS

TECHNICAL FIELD

The subject application is related to wireless communication systems, and, for example, to selection of resources by user equipments (UEs) for use in a wireless network.

BACKGROUND

Currently, in some wireless networks, when resources are needed for communication, UEs can autonomously select resources for use from available resources. To improve results of autonomous selections of resources, UEs currently have a sensing mechanism that can collect information and try to predict, among other things, a likelihood of interference by other UEs.

One problem with current approaches is that UEs can be unable to collect enough information about different factors, including interference, other UEs, and available resources. This lack of information can lead to sub-optimal selection of resources because resources can erroneously appear as good selections, or no differences between resources are detected to direct a UE to a particular choice.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
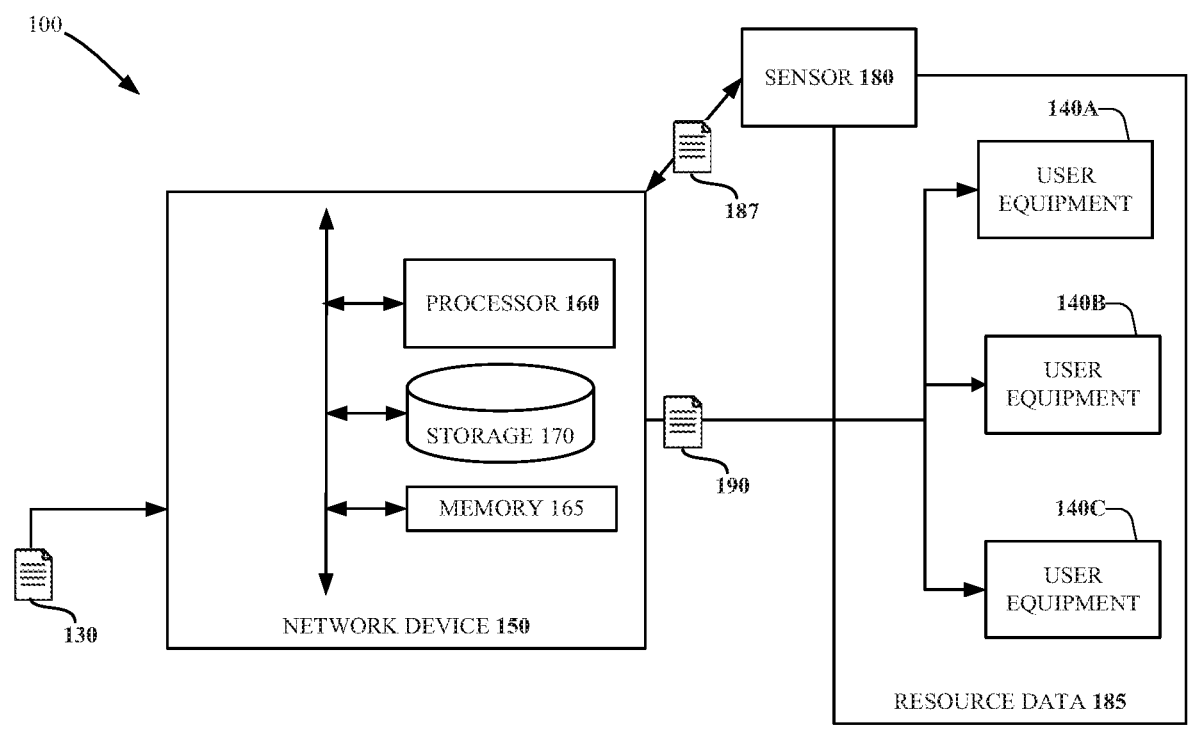
FIG. 1 is an architecture diagram of an example system that facilitates communicating determined contention levels of respective ones of a group of resource pools, in accordance with one or more embodiments.

Briefly, one or more aspects of the technology described herein can be directed towards a multi-connectivity framework that supports the operation of New Radio (NR, sometimes referred to as 5G) vehicle-to-everything (V2X) services. As will be understood, the technology allows seamless integration of V2X user equipments with network assistance by supporting control and mobility functionality on cellular links (e.g. LTE or NR), which provide benefits that can include robustness, reduced overhead, and global resource management, while facilitating direct communication links via NR sidelink.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

In some embodiments the non-limiting term user equipment (UE) is used. It refers to any type of wireless device that communicates with a radio network node in a cellular or mobile communication system. Examples of user equipment are target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles etc.

Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000 etc.

Wireless radio technology provides the ability promote a UE (which can be a special type of UE such as a Vehicle or Road-side Unit) to act as local manager for a group of neighboring UEs that exchange information by employing sidelink connections. For one or more embodiments described herein, a local manager can act a relay node to relay information to other user equipments of the group.

It should be noted that, as used generally herein, resources available for use by UEs are a part of resource pools (e.g., a group of resources) and, before a resource is selected for use, a resource pool is selected by the UE. Typically, a UE is notified of available resource pools by a central network associated with the UE. Then, UE may autonomously select a subset of resource in the configured resource pool to transmit data, e.g., a sidelink data packet. The use of the term resource pool is intended to be non-limiting, and individual resources can also be assessed and selected in accordance with one or more embodiments.

FIG. 1 illustrates a block diagram of an example, non-limiting system 100 that includes network device 150 and UEs 140A-C. Network device 150 can facilitate communicating determined contention levels 190 of respective ones of a group of resource pools to a group of UEs 140A-C, in accordance with one or more embodiments described herein.

According to multiple embodiments, network device 150 includes memory 165 can store one or more computer and/or machine readable, writable, and/or executable components and/or instructions that, when executed by processor 160, can facilitate performance of operations defined by the executable component(s) and/or instruction(s). For example, memory 165 can store computer and/or machine readable, writable, and/or executable components and/or instructions that, when executed by processor 160, can facilitate execution of the various functions described herein relating to network device 150, including assigning and communicating contention levels of a group of resource pools.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more central processing unit, multi-core processor, microprocessor, dual microprocessors, microcontroller, System on a Chip (SOC), array processor, vector processor, and/or another type of processor. Further examples of processor 160 are described below with reference to processing unit 1004 of FIG. 10. Such examples of processor 160 can be employed to implement any embodiments of the subject disclosure.

It should be appreciated that the embodiments of the subject disclosure depicted in various figures disclosed herein are for illustration only, and as such, the architecture of such embodiments are not limited to the systems, devices, and/or components depicted therein. For example, in some embodiments, network device 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

One or more embodiments of network device 150 can receive network contention information 130, describing network contention level information for a group of resource pools for use by UEs 140A-C. Alternatively or in supplement to the previous approach, network device 150 can receive sensed contention information 187 about resource data 185, as measured by sensor 180. Different ways of utilizing these data are discussed below with the descriptions of FIGS. 3-4.

In one or more embodiments, network device 150 can assign determined contention levels to respective ones of a group of resource pools, e.g., contention levels determined from sensed contention information 187 and network contention information 130. Network device 150 can further communicate to a user equipment device, the determined contention levels, thus enabling the user equipment device to select a resource pool of the group of resource pools based on the determined contention levels, e.g., determined from sensed contention information 187 and network contention information 130.

Figure 2:
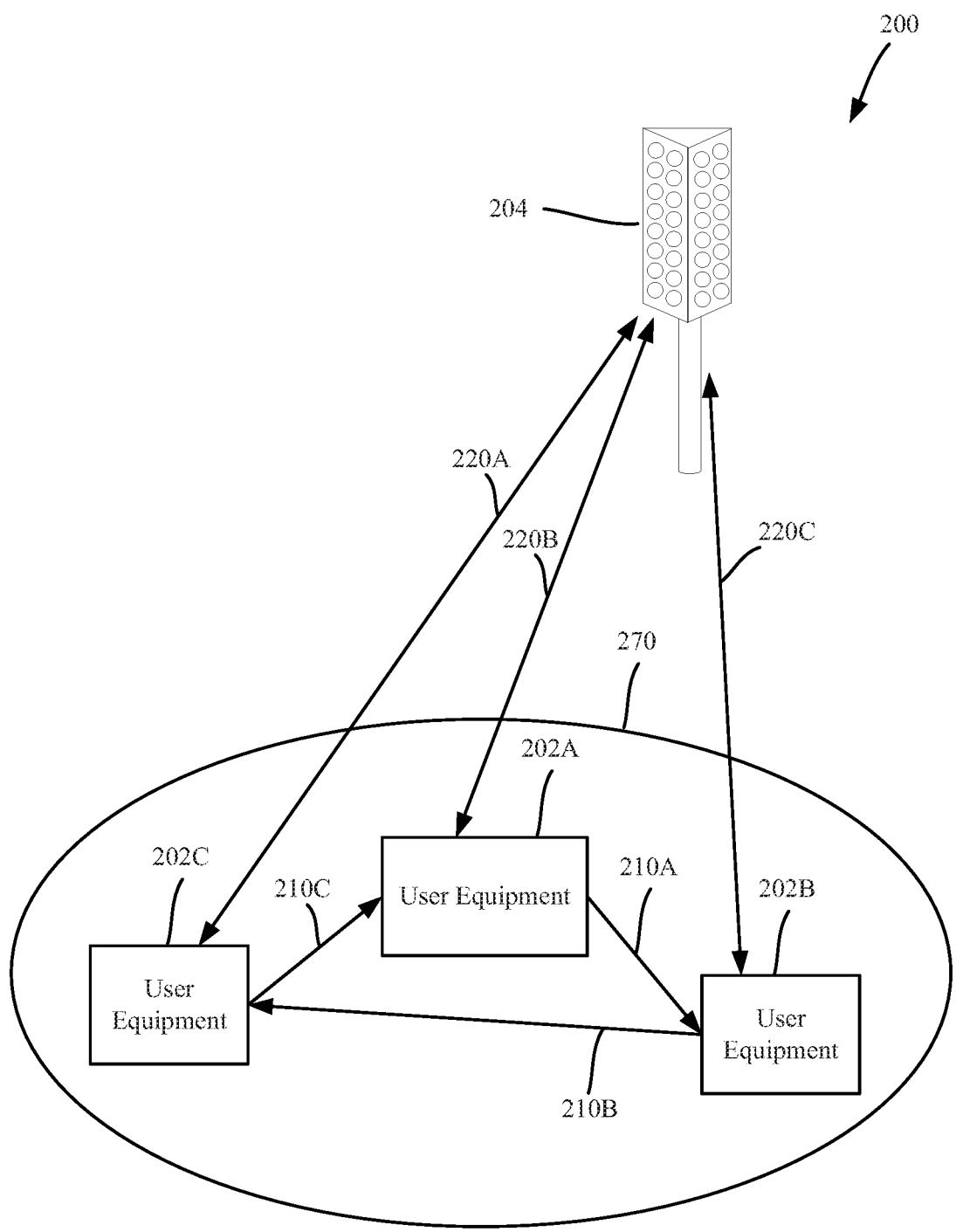
FIG. 2 illustrates an example wireless communication system showing an example of a vehicle-to-everything (V2X) deployment, in accordance with one or more embodiments.

FIG. 2 illustrates an example wireless communication system 200 showing an example of a vehicle-to-everything (V2X) deployment, in accordance with one or more embodiments. For purposes of brevity, description of like elements and/or processes employed in other embodiments is omitted.

In one or more embodiments, wireless communication system 200 can comprise one or more UEs 202A-C arranged in a UE group 270. In one or more embodiments, a V2X multi-connectivity framework described herein can be used to improve the performance of different types of communication services, e.g., vehicle communication services. In an example embodiment, UEs 202A-C communicate among UEs in UE group 270 using resources, e.g., time and frequency combinations that can facilitate communication, e.g., sidelink communication 210A-C between UEs 202A-C. In one or more embodiments, UEs 202A-C can also communicate wirelessly with network device 204, e.g., by employing connections 220A-C respectively.

In one or more embodiments, each UE 202A-C can autonomously select available resources for use for sidelink communication 210A-C, and these available resources can be offered to UEs 202A-C using resource pools, e.g., collections of resources grouped together. In one or more embodiments, network device 204 can provide resource pools to UEs 202A-C by employing connections 220A-C.

In an example implementation where UE group 270 is operating with a high system load (e.g., many UEs simultaneously), the chances of multiple UEs autonomously selecting the same resource increases. Resource collision means UEs are interfering each other, which may result in transmission failures. In one or more embodiments, sidelink communication 210A-C uses error correction protocols (e.g., Hybrid automatic repeat request (HARQ)), and failed transmissions with these protocols can trigger retransmissions that can further increase the likelihood of collisions and degradation of the network performance.

In one or more embodiments, UEs 202A-C can employ a sensing mechanism to assist with autonomous resource selection. For example, UEs 202A-C can monitor the received signal power or energy on resource pools, and select a pool which exhibits lower utilization. To provide additional information for this autonomous selection of resource pools by UEs 202A-C, one or more embodiments can employ network device 204 to provide additional information, e.g., improving selection during occasions when resource pools appear to the sensing mechanism to have similar levels of utilization. As noted above, in one or more embodiments, this additional information is the determined contention level of the available resource pools.

Figure 3:
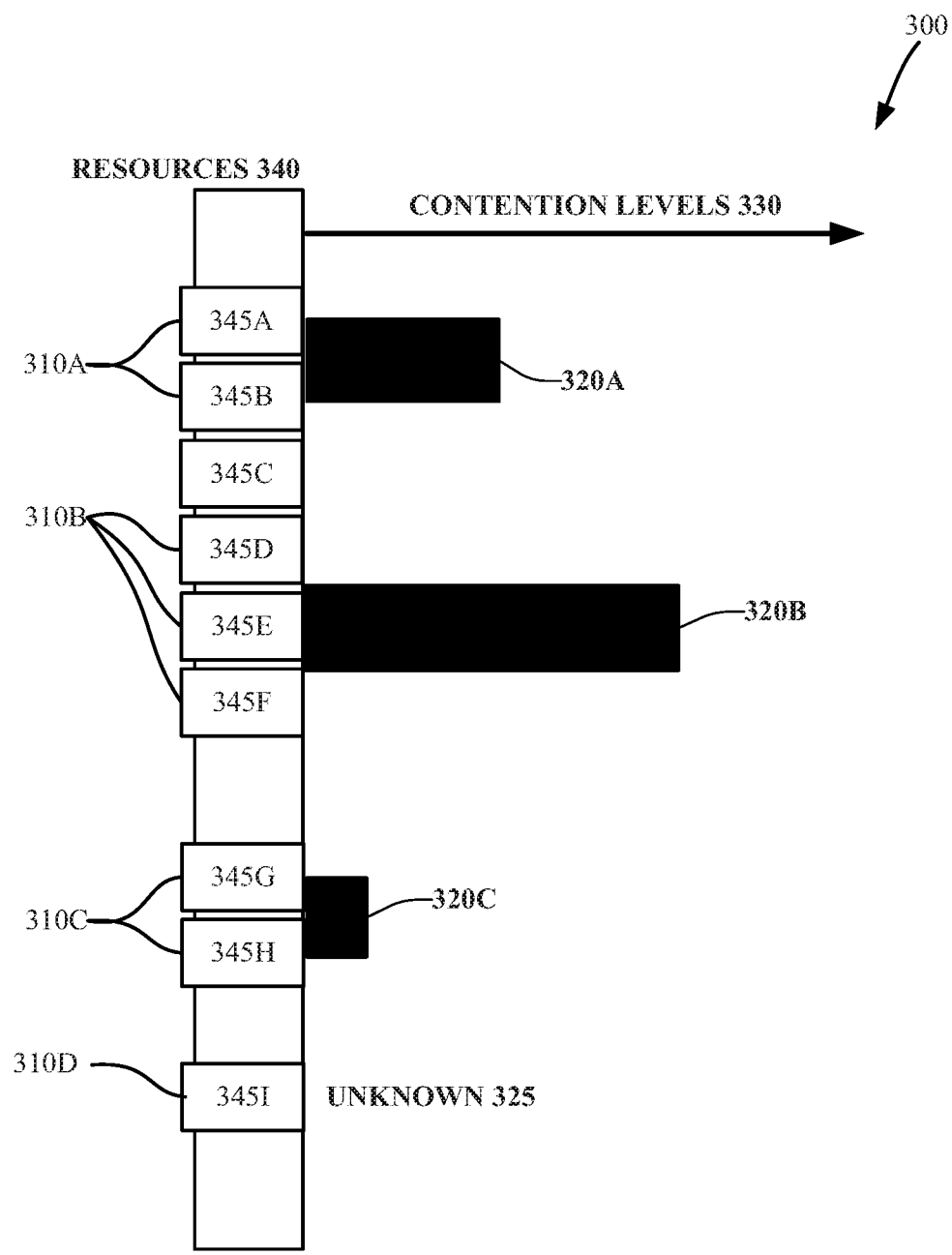
FIG. 3 illustrates an example of a group of resource pools along with sample contention levels for resources in the resource pools, in accordance with one or more embodiments.

FIG. 3 illustrates an example of a group of resource pools 310A-D of ones of resources 345A-I, along with sample contention levels 330 for resource pools 310A-C, in accordance with one or more embodiments. In an example discussed further below, the contention level of resource pool 310D is unknown 325. For purposes of brevity, description of like elements and/or processes employed in other embodiments is omitted.

In this example, three resource pools 310A-D respectively include resources 345A-B, 345D-F, 345G-H, and 345I. In one or more embodiments, contention levels 330, available from network device 204, are based on more information than is detectable by UEs 202A-C employing sensing mechanisms as described above. Example additional information that can be used by embodiments to determine contention levels 320A-C respectively for resource pools 310A-C can include information about UE group 270 and other nearby groups, such information not being available to group members UEs 202A-C in one or more embodiments.

As discussed further with FIG. 4 below, in one or more embodiments, sensing by UEs 202A-C can provide an estimated short-term level of occupancy for a resource pool and contention levels provided by network device 204 can provide estimates of long-term occupancy.

Continuing the example of FIG. 3, resource pools 310A-C are available in UE group 270 for selection by UE 202A, and UE 202A can monitor the received power and energy of the resource pools 310A-C to determine, for example, that the three resource pools have similar utilization levels.

As illustrated in FIG. 3 however, in this example resource pools 310A-C have significantly different contention levels 320A-C, and when these contention levels are communicated to UE 202A, a clearly preferable resource pool (e.g., resource pool 310C) is apparent. As discussed further with FIGS. 5-6 below, in one or more embodiments, resource pool 310D, having an unknown 325 value, can be omitted from consideration by UE 202A.

Figure 4:
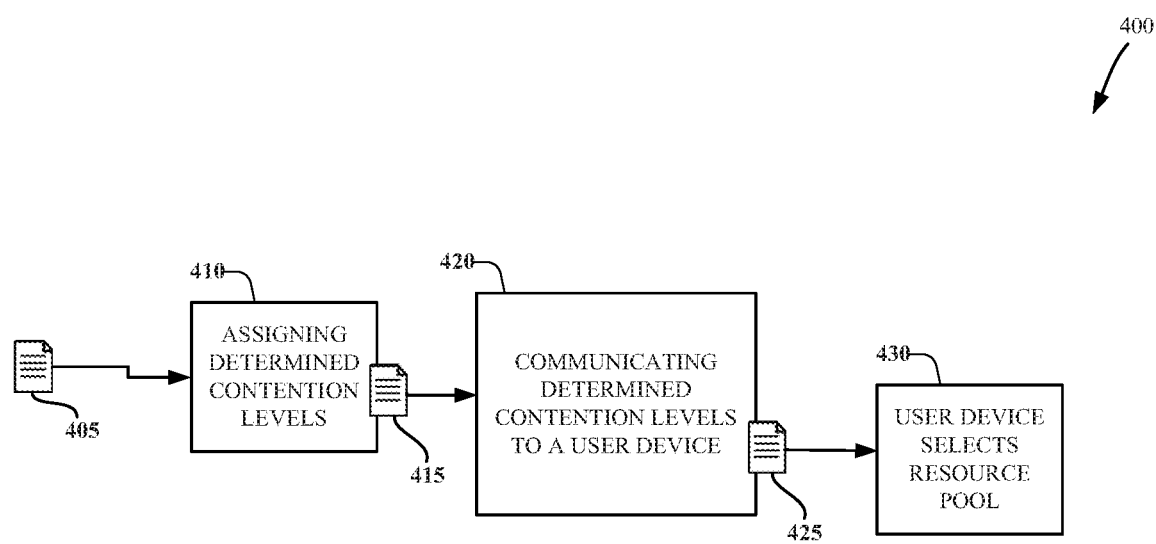
FIG. 4 is a data flow diagram of an example system that facilitates communicating determined contention levels of respective ones of a group of resource pools, in accordance with one or more embodiments.

FIG. 4 is a data flow diagram of an example system that facilitates communicating determined contention levels of respective ones of a group of resource pools, in accordance with one or more embodiments. For purposes of brevity, description of like elements and/or processes employed in other embodiments is omitted.

At 405 determined contention level and resource pool data is received by block 410, where the determined contention levels are assigned to the resource pools. As noted above, the determination of contention levels for resource pools can be different than the sensing of ambient characteristics about the resource pools (e.g., signal power, Qos, and energy) by UEs. In one or more embodiments, contention level can be a comprehensive indicator, e.g., a simple index where the range of levels can be determined by required granularity. As noted above, one use of this contention level by one or more embodiments is to provide information to a UE for comparing between multiple resource pools to select one for transmission, especially when the sending of the UE does not distinguish differences between resource pools.

For example, UE 202A may be configured use two resource pools, one resource pool 310A being configured with aggressive power control parameters and another resource pool 310B being configured with conservative power control parameters. In this example, even with these differences, the UE 202A can sense the same level of receiving signal strength on both resource pools, and thus be unable to identify an advantageous selection. After a contention level analysis as described herein, resource pool 310A, the aggressive power control parameters resource pool has a lower determined contention level (e.g., a lower chance of collision) because the higher power resource pool 310B can include interference from more, farther away UEs. Thus, in this example, the contention level indicator as described herein, UE 202A can make better choice in terms of selecting a better resource pool 310A for current transmission. In additional embodiments, UE 202A combines the contention level values with sensed link quality and the a QoS requirement of a data packet to be sent using the selected resource pool.

In one or more embodiments, contention levels can be determined by the measurement and combination of many different factors. Some factors are only known by network device 204 (e.g., characteristics of UE group 270 and member UEs 202A-C), including, for example: a number of user equipment devices sharing the capability of using a resource pool, a number of local managers sharing the capability of using a resource pool, a number of UEs sharing management by a local managers, power control parameters user by UEs sharing the capability of using a resource pool, geographic sizes of the area where UEs sharing the capability of using a resource pool are located, and quality of service requirements for the respective ones of the group of resource pools. In addition to characteristics of the UEs and groups that can use a resource pool, values can be centrally set to generally improve communication by reducing collisions, including for example: a maximum allowed transmission power for ones of the user equipment devices sharing the respective ones of the group of resource pools, a maximum allowed interference for the respective ones of the group of resource pools. It should be noted that factors in the second list can also be set at individual UEs, and factor in the first list can be set centrally. The examples above are meant to be non-limiting examples of the types of information that can be used to determined contention levels for resource pools, in accordance with one or more embodiments.

In another example of the operation of embodiments described herein, if a comparatively high contention level is determined for a resource pool, with contention level information communicated to UEs 202A-C by network device 204, the high-contention pool can be effectively barred from being selected until, for example, a time period has passed, the level of contention and utilization drops to a lower level, and other similar conditions. In one or more embodiments, to effect the barring of the high-contention pool, network device 204 can generate a transmission that the high-contention pool is barred from use, and this transmission can be communicated to UEs 202A-C.

Returning to the embodiment shown in FIG. 4, at block 420 the determined contention levels 415 are communicated to a user device. At block 430, the user device selects resource pool 425 for use.

Figure 5:
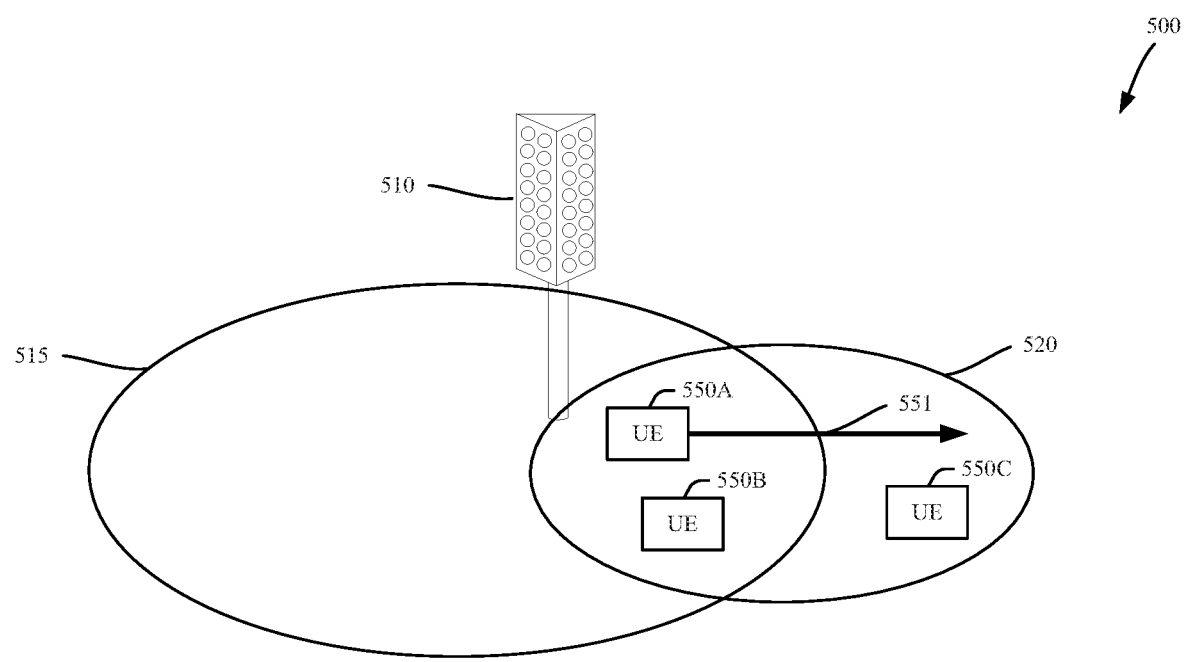
FIGS. 5-6 illustrate an example network layouts and flow diagram, where grouped user equipments receive a contention level of a group of resource pools, along with a characteristic of a resource pool that it is only for use by in-network user equipments or can be shared with both in-network and out of network user equipments, in accordance with one or more embodiments.
Figure 6:
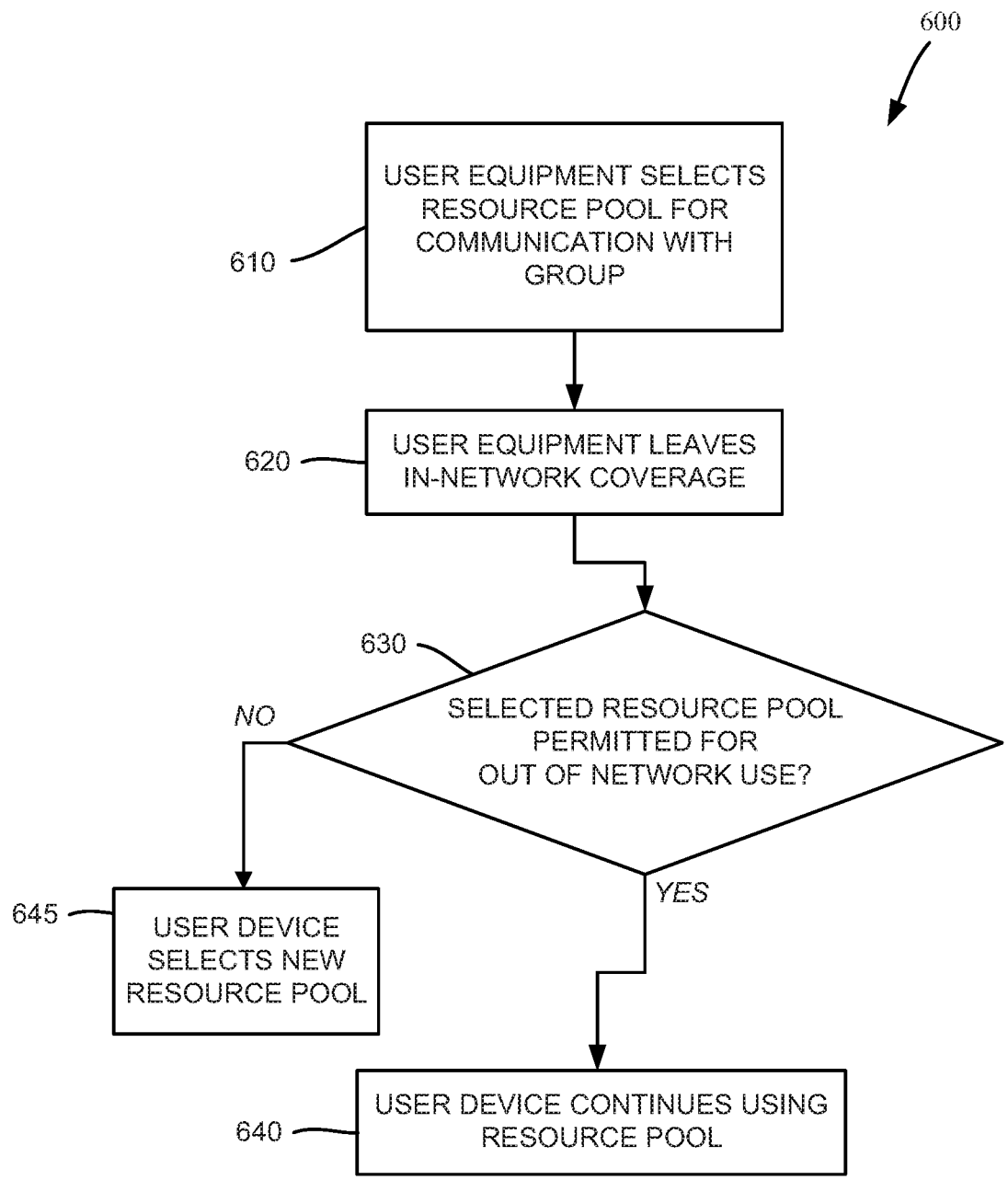

FIGS. 5-6 illustrate an example network layout 500 and flow diagram 600, where grouped user equipments receive contention levels of a group of resource pools, along with a resource pool having a characteristic that it is either dedicated for use by in-network UEs, or can be shared with both in-network and out of network UEs, in accordance with one or more embodiments. For purposes of brevity, description of like elements and/or processes employed in other embodiments is omitted.

It should be noted that, as used to describe one or more embodiments, an in-network UE is a UE that has an active signaling connection to the network, e.g., a connection to network device 510. Stated differently, in one or more embodiments, the UE is in the network because of a connection to network device 510. Similarly, an out of network user equipment device does not have an active signaling connection to the network.

FIG. 5 depicts network device 510 (e.g., a base station), a geographic region of network coverage 515 of the network of network device 510, and a resource group 520 that includes UEs 550A-C. In this example, UEs 550A-B are devices associated with the network of network device 510, and are operating in network coverage 515. In contrast, in this example, UE 550C is included in group 520 with UEs 550A-B, but is not associated with the network of network device 510, and can receive available network pools from a local manager of group 520, e.g., UE 550A.

Movement arrow 551 is indented to convey that, in this example, UE 550A moves from inside network coverage 515 to outside this network coverage, e.g., as described above, has transitioned from being an in-network UE to an out of network UE. One or more embodiments can, when communicating contention level information to UEs 202A-B by network device 204, dedicate particular resource pools for use in network coverage 515, and connected to the network, only. Alternatively, network device 204 can restrict use of particular resource pools from being used out of network coverage 515, e.g., in this example UE 550A, as shown in block 610 of FIG. 6, initially in network coverage 515 selects a resource pool dedicated only to in network coverage 515 use. Thus, in an example embodiment, when, as in block 620, UE 550A leaves network coverage 515, block 630 describes a check to determine whether the resource pool used by UE 550A is permitted for out of network use. In this example, because the resource pool is not permitted for out of network use (e.g., no to the question of block 630), UE 550A selects a different unrestricted resource pool for use. Alternatively, in an example where UE 550A is using a resource pool that exhibits a characteristic that it permits out of network use (e.g., yes to the question of block 630), UE 550A can continue to use the resource pool previously selected.

One reason why one or more embodiments limit use of resource pools by out of network UEs is that many of the factors used to determine a contention level for a resource pool can be unavailable outside of network coverage 515. For example, when out of network UEs share a resource pool, the total amount of UEs that can share the resource pool can be unavailable. Because, without determined contention levels, UEs do not have access to the additional information about a resource pool, as described above, one or more embodiments can restrict the use of the resource pool to reduce interference. In one or more embodiments, when a contention level is unable to be determined (e.g., resource pool 310D) for any reason, e.g., from lack of available factors, network device 204, when communicating resource pool information discussed herein, can notify UEs that a contention level for a resource group was unable to be determined.

Another reason that one or more embodiments restrict use of a resource pool outside of network coverage 515 is that the resources in the resource pool may only be able to be used (e.g., licensed) within a particular geographic area. Because, when a UE is outside of network coverage 515, the location of the UE may be unavailable to be used to enforce the resource use restrictions, one or more embodiments can use these types of restrictions to limit use of a resource in advance.

Figure 7:
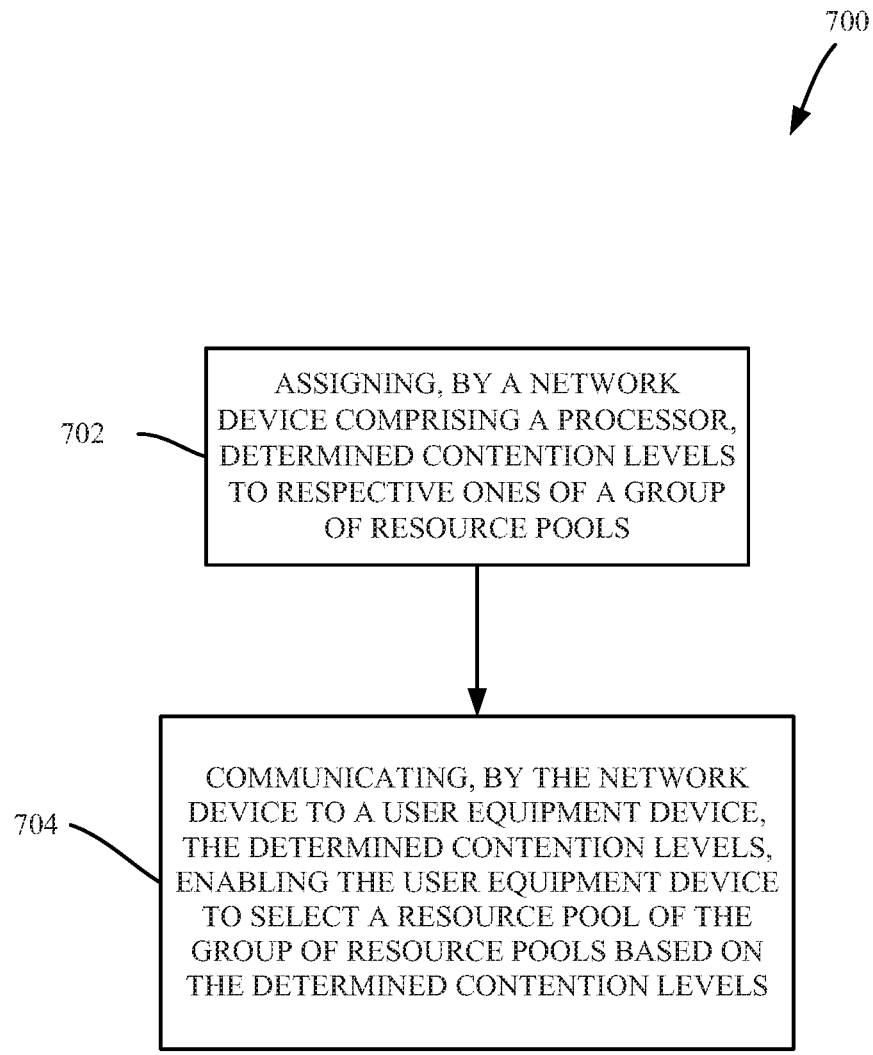
FIG. 7 illustrates a flow diagram of an example method that can facilitate communicating determined contention levels of respective ones of a group of resource pools, in accordance with one or more embodiments.

FIG. 7 illustrates a flow diagram of an example method 700 that can facilitate communicating determined contention levels of respective ones of a group of resource pools, in accordance with one or more embodiments. For purposes of brevity, description of like elements and/or processes employed in other embodiments is omitted.

At 702, example method 700 can assign, by a network device (e.g., network device 150) comprising a processor (e.g., processor 160), determined contention levels (e.g., determined contention levels 320A-C) to respective ones of a group of resource pools (e.g., resource pools 310A-C).

At 704, example method 700 can communicate, by the network device to a user equipment device (e.g., network device 150 communicating with UE 140A), the determined contention levels (e.g., determined contention levels 190), enabling the user equipment device (e.g., 140A) to select a resource pool (e.g., resource pool 310A) of the group of resource pools (e.g., resource pools 310A-C) based on the determined contention levels (e.g., 320A-C).

Figure 8:
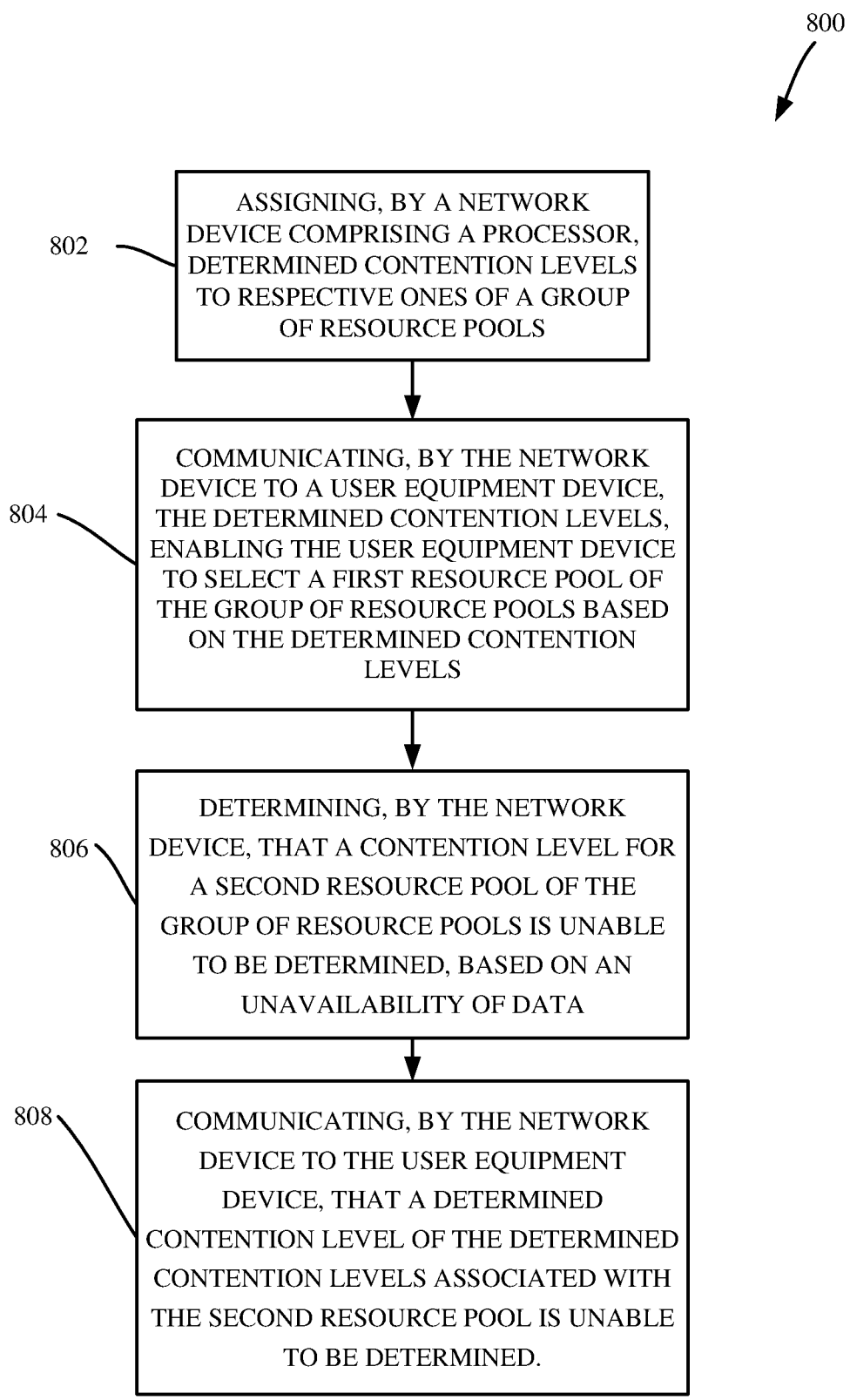
FIG. 8 illustrates a flow diagram of an example method that can facilitate communicating that a contention level for a resource pool cannot be determined, in accordance with one or more embodiments.

FIG. 8 illustrates a flow diagram of an example method 800 that can facilitate communicating that a contention level for a resource pool cannot be determined, in accordance with one or more embodiments. For purposes of brevity, description of like elements and/or processes employed in other embodiments is omitted.

At 802, example method 800 can assign, by a network device (e.g., network device 150) comprising a processor (e.g., processor 160), determined contention levels (e.g., determined contention levels 320A-C) to respective ones of a group of resource pools (e.g., resource pools 310A-C).

At 804, example method 800 can communicate, by the network device to a user equipment device (e.g., network device 150 communicating with UE 140A), the determined contention levels (e.g., determined contention levels 190), enabling the user equipment device (e.g., 140A) to select a first resource pool (e.g., resource pool 310A) of the group of resource pools (e.g., resource pools 310A-D) based on the determined contention levels (e.g., 320A-C).

At 806, example method 800 can determine, by the network device, that a contention level for a second resource pool (e.g., resource pool 310D) of the group of resource pools (e.g., 310A-D) is unable to be determined (e.g., contention level unknown 325), based on an unavailability of data (e.g., from network contention information 130 and sensed contention information 187).

At 808, example method 800 can communicate, by the network device (e.g., network device 204) to the user equipment device (e.g., UE 202A), that a determined contention level of the determined contention levels associated with the second resource pool is unable to be determined.

As can be seen, the technology described herein provides for increased robustness and reduced latency of initial access and V2X configuration when control plane and mobility signaling is provided over a sub6-GHz anchor link via multi-connectivity, (compared to a standalone architecture), in which V2X-capable UEs provide initial access, IDLE mode, control plane, and mobility functionality. The technology facilitates reduced overhead on mmWave backhaul links multiplexing cellular and V2X traffic (of one or more bands) by utilizing sub 6-GHz channels for control plane signaling instead of multiplexing both control and data links on mmWave bands. Still further, the technology described herein provides the ability to efficiently perform local manager configuration and association based on measurements/reports related to sidelink link quality metrics over sub6-GHz channels more efficiently than over the NR mmWave backhaul links. The technology described herein enables support for simultaneous cellular communication with a network infrastructure, in addition to V2X direct communication services on the same or different carriers.

Figure 9:
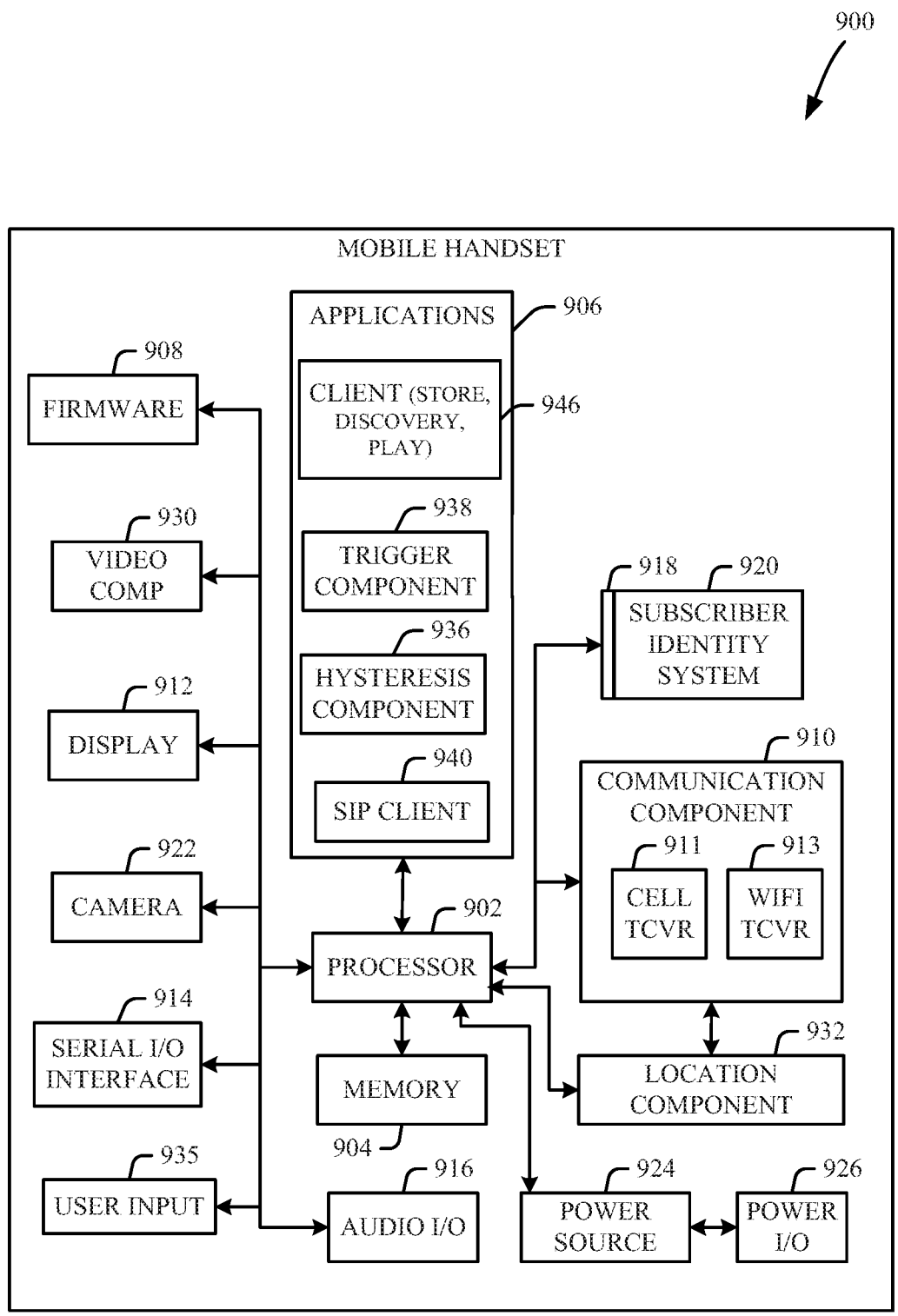
FIG. 9 illustrates an example block diagram of an example mobile handset operable to engage in a system architecture that can facilitate communicating determined contention levels of respective ones of a group of resource pools, in accordance with one or more embodiments.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Returning to aspects discussed with FIG. 2 above, in example implementations, user equipments, such as UEs 202A-C and handset 900, are able to send and/or receive communication data via a wireless link to the network device 204. Wireless communication system 200 can thus include one or more communication service provider networks that facilitate providing wireless communication services to various user equipments, including UEs 202A-C, via the network device 204 and/or various additional network devices (as is understood) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional user equipments, network server devices, etc.).

The network device 204 can be connected to the one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

The wireless communication system 200 can employ various cellular systems, technologies, and modulation schemes to facilitate wireless radio communications between devices (e.g., UEs 202A-C and the network device 204). While example embodiments include use of 5G new radio (NR) systems, one or more embodiments discussed herein can be applicable to any radio access technology (RAT) or multi-RAT system, including where user equipments operate using multiple carriers, e.g. LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 140A-C and the network device 150) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
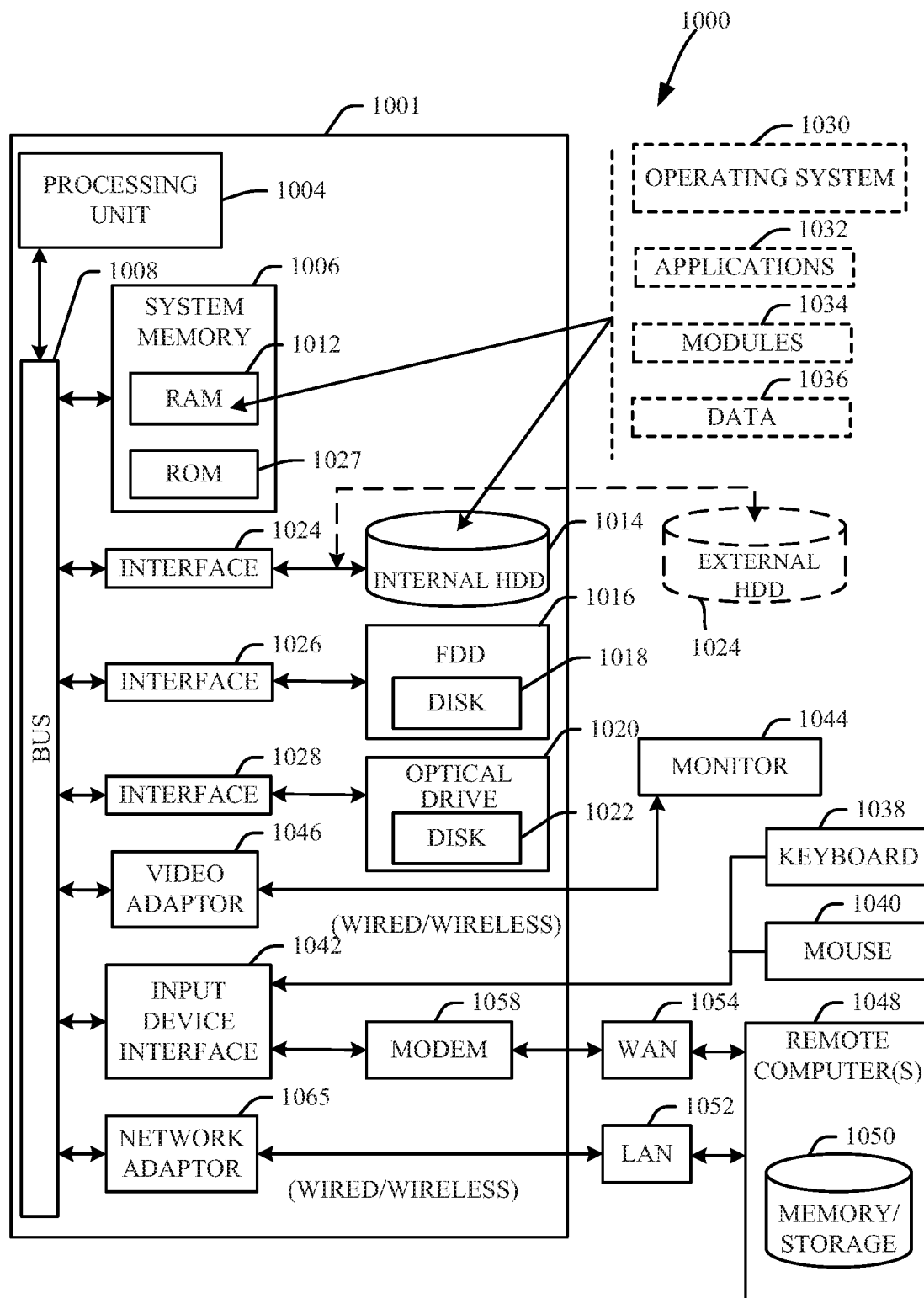
FIG. 10 illustrates an example block diagram of an example computer operable to engage in a system architecture that can facilitate communicating determined contention levels of respective ones of a group of resource pools, in accordance with one or more embodiments.

Referring now to FIG. 10, illustrated is an example block diagram of an example computer 1300 operable to engage in a system architecture that facilitates wireless communications according to one or more embodiments described herein. The computer 1300 can provide networking and communication capabilities between a wired or wireless communication network and a server (e.g., Microsoft server) and/or communication device. In order to provide additional context for various aspects thereof, FIG. 13 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 13 is but one example of a computing device.

In order to provide a context for the various aspects of the disclosed subject matter, FIG. 10 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1320 (see below), non-volatile memory 1322 (see below), disk storage 1324 (see below), and memory storage 1346 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL- DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of an operating environment 1000 operable to execute the disclosed systems and methods in accordance with an embodiment. Computer 1012, which can be, for example, part of the hardware of system 1020, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 and a move use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
   determining, by network equipment comprising a processor, contention levels for respective ones of a group of resource pools, resulting in determined contention levels, wherein a resource pool of the group of resource pools comprises resources pooled to be offered as a group of resources for selection by a user equipment based on the determined contention levels, wherein ones of resources of the resource pool were selected based on power control parameters of the ones of the resources; and
   communicating, by the network equipment to the user equipment, the determined contention levels, resulting in an enabling of the user equipment to select the resource pool from the group of resource pools based on the determined contention levels.

2. The method of claim 1, wherein the determined contention levels are determined based on at least one of:
   a first number of user equipment sharing the respective ones of the group of resource pools,
   a second number of local manager equipment sharing the respective ones of the group of resource pools,
   a third number of user equipment sharing respective manager equipment of the local manager equipment sharing the respective ones of the group of resource pools,
   a maximum allowed transmission power for ones of a group of user equipment sharing the respective ones of the group of resource pools,
   the power control parameters for the ones of the group of user equipment sharing the respective ones of the group of resource pools,
   geographic sizes of the respective ones of the group of resource pools,
   quality of service requirements for the respective ones of the group of resource pools, or
   a maximum allowed interference for the respective ones of the group of resource pools.

3. The method of claim 1, wherein the respective ones of the group of resource pools comprise respective time and frequency resources that facilitate sidelink communication, and wherein the enabling of the user equipment to select the resource pool comprises the enabling of the user equipment to select the resource pool for the sidelink communication.

4. The method of claim 1, wherein the enabling of the user equipment to select the resource pool is further based on a result of sensing, performed by the user equipment, a characteristic of the respective ones of the group of resource pools.

5. The method of claim 1, wherein the resource pool is a first resource pool, and further comprising:
   selecting, by the network equipment, a second resource pool of the group of resource pools based on a determined contention level of the determined contention levels associated with the second resource pool; and
   communicating, by the network equipment to the user equipment, that the second resource pool is barred from being used by the user equipment.

6. The method of claim 1, wherein the resource pool is a first resource pool, and further comprising:
   determining, by the network equipment, that a contention level for a second resource pool of the group of resource pools is unable to be determined, based on an unavailability of data; and
   communicating, by the network equipment to the user equipment, that the contention level for the second resource pool is unable to be determined.

7. The method of claim 1, wherein the resource pool is a first resource pool, and further comprising:
   determining that a second resource pool of the group of resource pools has a characteristic of being dedicated for use by a group of user equipment with an active connection to the network equipment; and
   communicating, by the network equipment to the group of user equipment, that the second resource pool has the characteristic.

8. The method of claim 1, wherein the resource pool is a first resource pool, and further comprising:
   determining that a second resource pool of the group of resource pools has a characteristic of being permitted to be shared by a first group of user equipment with a first active connection to the network equipment and a second group of user equipment without a second active connection to the network equipment; and
   communicating, by the network equipment to the user equipment, that the second resource pool has the characteristic.

9. A system, comprising:
   a processor; and
   a memory that stores executable instructions that, when executed by the processor, facilitate performance of operations, comprising:
     determining contention levels for respective ones of a group of resource pools, resulting in determined contention levels, wherein a resource pool of the group of resource pools comprises resources pooled to be offered as a group of resources for selection by a user equipment based on the determined contention levels, wherein ones of resources of the resource pool were selected based on power control parameters applicable to the ones of the resources; and
     communicating, to the user equipment, the determined contention levels, resulting in enabling the user equipment to select the resource pool from the group of resource pools based on the determined contention levels.

10. The system of claim 9, wherein the determined contention levels are determined based on at least one of:
    a first number of user equipment sharing the respective ones of the group of resource pools,
    a second number of local manager equipment sharing the respective ones of the group of resource pools,
    a third number of user equipment sharing respective manager equipment of the local manager equipment sharing the respective ones of the group of resource pools,
    a maximum allowed transmission power for ones of a group of the user equipment sharing the respective ones of the group of resource pools,
    the power control parameters for the ones of the group of user equipment sharing the respective ones of the group of resource pools, geographic sizes of the respective ones of the group of resource pools,
quality of service requirements for the respective ones of the group of resource pools, or
a maximum allowed interference for the respective ones of the group of resource pools.

11. The system of claim 9, wherein the respective ones of the group of resource pools comprise respective time and frequency resources that facilitate sidelink communication, and wherein the enabling of the user equipment to select the resource pool comprises the enabling of the user equipment to select the resource pool for the sidelink communication.

12. The system of claim 9, wherein the enabling of the user equipment to select the resource pool is further based on receiving a result of sensing, by the user equipment, a characteristic of the respective ones of the group of resource pools.

13. The system of claim 9, wherein the resource pool is a first resource pool, and wherein the operations further comprise:
selecting a second resource pool of the group of resource pools based on a determined contention level of the determined contention levels associated with the second resource pool; and
communicating, to the user equipment, that the second resource pool is barred from being used by the user equipment.

14. The system of claim 9, wherein the resource pool is a first resource pool, and wherein the operations further comprise:
determining that a contention level for a second resource pool of the group of resource pools is unable to be determined, based on an unavailability of data; and
communicating, to the user equipment, that the contention level for the second resource pool is unable to be determined.

15. The system of claim 9, wherein the resource pool is a first resource pool, and wherein the operations further comprise:
determining that a second resource pool of the group of resource pools exhibits a characteristic of being dedicated for in-network user equipment; and
communicating, to the user equipment, that the second resource pool exhibits the characteristic.

16. The system of claim 9, wherein the resource pool is a first resource pool, and wherein the operations further comprise:
determining that a second resource pool of the group of resource pools exhibits a characteristic of being permitted to be shared by in-network and out-of-network user equipment; and
communicating, to the user equipment, that the second resource pool exhibits the characteristic.

17. A non-transitory machine-readable medium, comprising executable instructions that, when executed by a processor of network equipment, facilitate performance of operations, comprising:
determining contention levels for respective ones of a group of resource pools, resulting in determined contention levels, wherein a resource pool of the group of resource pools comprises resources pooled to be offered as a group of resources for selection by a user equipment based on the determined contention levels, wherein ones of resources of the resource pool were selected based on power control parameters associated with the ones of the resources; and
facilitating transmission, to the user equipment, the determined contention levels, resulting in an enabling of a selection of the resource pool from the group of resource pools at the user equipment based on the determined contention levels.

18. The non-transitory machine-readable medium of claim 17, wherein the respective ones of the group of resource pools comprise respective time and frequency resources that facilitate sidelink communication, and wherein the enabling of the selection comprises the enabling of the selection of the resource pool for the sidelink communication.

19. The non-transitory machine-readable medium of claim 17, wherein the enabling of the selection comprises the enabling of the selection of the resource pool further based on receiving a result of having sensed, by the user equipment, a characteristic of the respective ones of the group of resource pools.

20. The non-transitory machine-readable medium of claim 17, wherein the transmission is a first transmission, wherein the resource pool is a first resource pool, and wherein the operations further comprise:
selecting a second resource pool of the group of resource pools based on a determined contention level of the determined contention levels associated with the second resource pool; and
facilitating a second transmission, to the user equipment, indicating that the second resource pool is barred from being used by the user equipment.

* * * * *